United States Patent
Asplund et al.

(10) Patent No.: US 8,044,537 B2
(45) Date of Patent: Oct. 25, 2011

(54) MODULAR HVDC CONVERTER

(75) Inventors: Gunnar Asplund, Ludvika (SE); Mats Hyttinen, Ludvika (SE)

(73) Assignee: ABB Technology Ltd., Zürich (CH)

( * ) Notice: Subject to any disclaimer, the term of this patent is extended or adjusted under 35 U.S.C. 154(b) by 97 days.

(21) Appl. No.: 12/306,729

(22) PCT Filed: Jun. 28, 2006

(86) PCT No.: PCT/SE2006/050226
§ 371 (c)(1),
(2), (4) Date: Jun. 22, 2009

(87) PCT Pub. No.: WO2008/002226
PCT Pub. Date: Jan. 3, 2008

(65) Prior Publication Data
US 2009/0295225 A1 Dec. 3, 2009

(51) Int. Cl.
*H02J 1/00* (2006.01)
(52) U.S. Cl. .......................................................... 307/82
(58) Field of Classification Search ....................... 307/82
See application file for complete search history.

(56) References Cited

U.S. PATENT DOCUMENTS

| | | | |
|---|---|---|---|
| 4,019,115 A | 4/1977 | Lips | |
| 4,941,079 A | 7/1990 | Ooi | |
| 6,275,396 B1 * | 8/2001 | Farrar | 363/65 |
| 6,865,080 B2 | 3/2005 | Radosevich et al. | |
| 7,166,933 B2 * | 1/2007 | Muramatsu et al. | 307/82 |
| 7,327,587 B2 * | 2/2008 | Mhaskar et al. | 363/37 |

FOREIGN PATENT DOCUMENTS

| | | |
|---|---|---|
| EP | 0 695 024 B1 | 2/2003 |
| EP | 1 385 259 A2 | 1/2004 |
| WO | WO 00/74198 A1 | 12/2000 |
| WO | WO 01/48892 A1 | 7/2001 |
| WO | WO 01/52379 A2 | 7/2001 |
| WO | WO 03/044939 A1 | 5/2003 |
| WO | WO 2005/078889 A1 | 8/2005 |

OTHER PUBLICATIONS

International search report—Feb. 8, 2007.
International preliminary report on patentability—Sep. 23, 2008.

* cited by examiner

*Primary Examiner* — Michael Rutland Wallis
(74) *Attorney, Agent, or Firm* — Venable LLP; Eric J. Franklin

(57) ABSTRACT

A modular HVDC converter system including a high voltage direct current network, and at least two DC/AC converters being connected in series to the HVDC network. Each of the DC/AC converters is arranged to provide AC to a separate AC load.

16 Claims, 11 Drawing Sheets

US 8,044,537 B2

MODULAR HVDC CONVERTER

CROSS-REFERENCE TO RELATED APPLICATIONS

This application is the national phase under 35 U.S.C. §371 of PCT/SE2006/050226 filed 28 Jun. 2006.

THE FIELD OF THE INVENTION

The present invention relates to a High Voltage Direct Current (HVDC) converter system and in particular a modular HVDC converter system its components and use thereof

BACKGROUND OF THE INVENTION

Feeding power to or from remote or awkwardly situated distributed installations from or to an existing power network creates slightly different challenges compared to normal installations. This is especially true for installations with several high power sources or loads. Examples of such remote or awkwardly situated distributed installations are offshore installations for oil and/or gas production especially installations sub sea, offshore wind mill installations, and mining districts or process plants at remote locations.

As is disclosed in EP 1385259, WO 0152379 and WO 0148892 it is favorable to use HVDC transmission to feed power to and from such installations.

The advantages of DC transmission have been commercially exploited since 1954 when the first HVDC transmission was commissioned. Mercury-arc valves were eventually replaced with high power thyristors and dc transmissions have reached several GW, over +/−600 kV, and distances around 1000 kilometres. In 1997, a new breed of HVDC converter stations and HVDC transmissions were introduced. ABB has named its product family HVDC Light®.

The use of forced-commutated power semiconductors in a voltage-source converter allows much increased control of the active power flow, reactive power flow and harmonics when connected to even weak ac grids. This is well-known from low-voltage applications. The key factor allowing voltage-source converters to be connected to networks at voltage levels hitherto unreachable, is the series-connection of power transistors—in ABB's case IGBTs.

HVDC Light® can be connected to underground/submarine cables or overhead lines, on the dc as well as the ac side. A significant difference between classic HVDC and HVDC Light® is that in the latter, the dc-link voltage polarity is constant, irrespective of the direction of power flow.

The present Light® technique, e.g. represented by EP 1385 259 A, is a good solution for remote or awkwardly situated distributed installations regarding controllability, low operating cost but also size and investment cost is within reasonable levels. In this solution, the power to the installation is fed through HVDC cables and a HVDC Light® converter operates as AC power supply for a local AC network used to distribute the power at the installation, e.g to electric motors etc. Back up power is often provided via a local power supply using gas turbines or the like. However, such local power supplies require considerably space and offshore manning.

SUMMARY OF THE INVENTION

The object of the invention is to provide a new HVDC converter system which overcomes the drawbacks of the prior art. This is achieved by the modular HVDC converter system, its components and use thereof.

Some advantages with the HVDC converter system according to the invention are:

Each one of the modular converters is small sized and light compared to conventional converters, thereby the handling will be simpler, especially handling during maintenance and reparations.

The modular approach gives considerably better redundance compared with conventional converters, as the failure of one converter will not lead to full loss of electrical power, and loads connected to other converters will not be affected.

The modular converters can provide AC power of variable frequency, and are thus capable to function as drive units for electric motors.

These issues become even more important for offshore installations and in particular for installations subsea.

Other advantages are apparent from the following detailed description of the present invention.

BRIEF DESCRIPTION OF THE DRAWINGS

The invention will be described in detail below with reference to the drawings, in which.

DETAILED DESCRIPTION OF PREFERRED EMBODIMENTS

Figure 1:
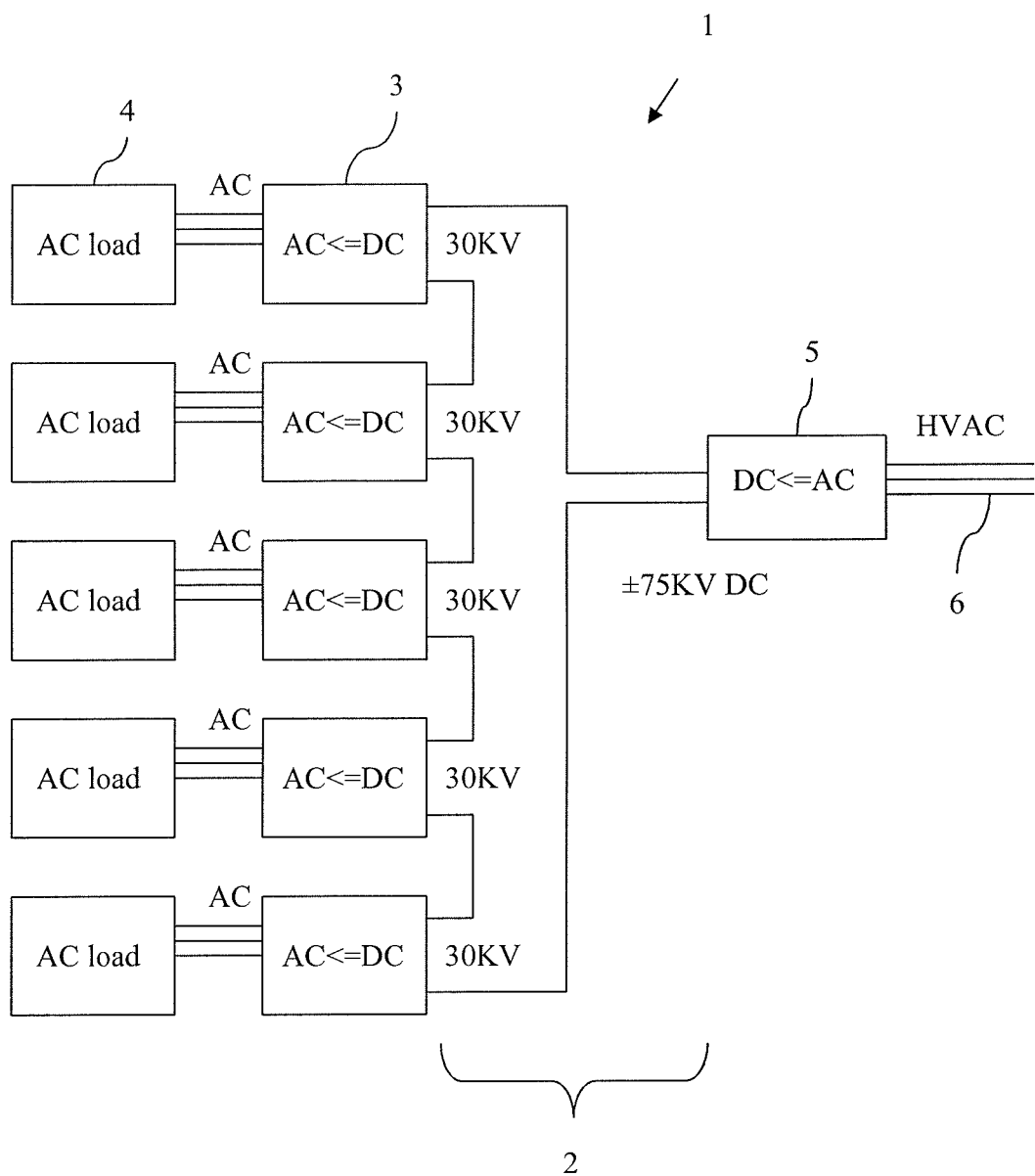
FIG. 1 shows a general circuit diagram of the modular HVDC converter system according to the present invention.
Figure 4A:
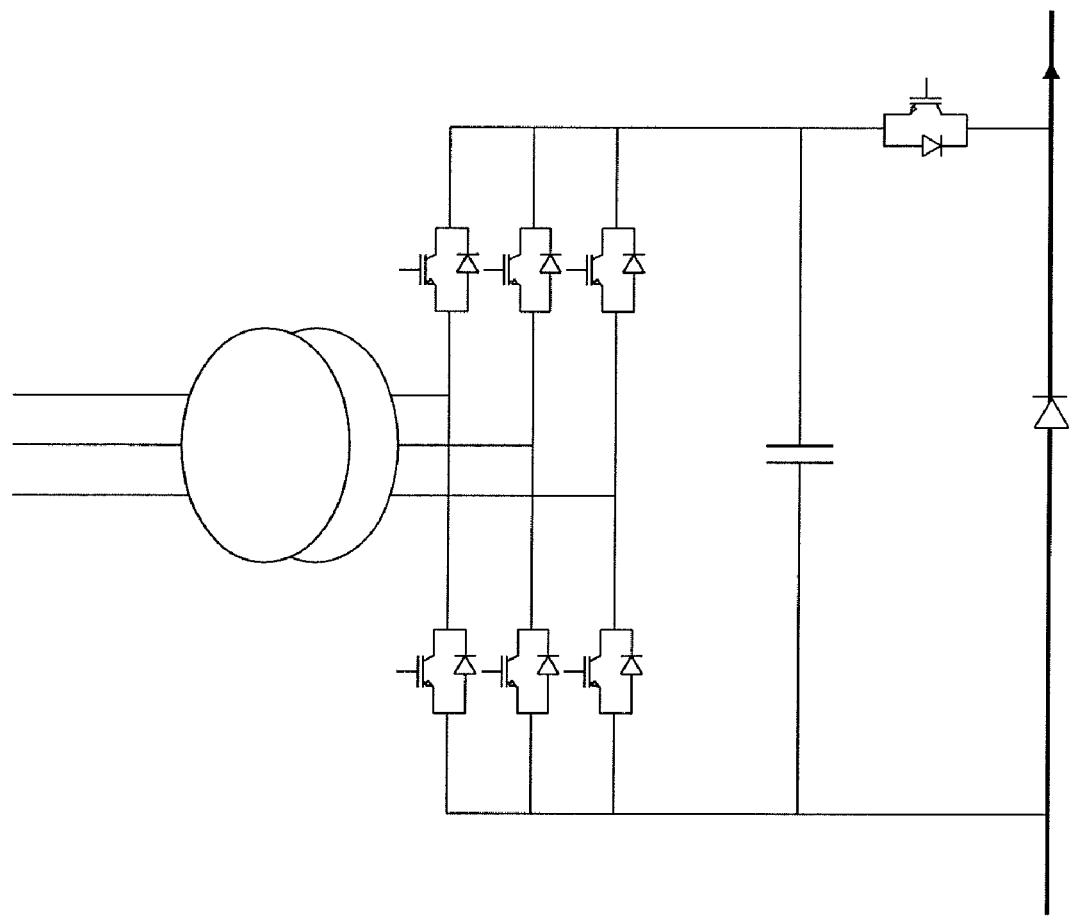
FIGS. 4a to 4c show three examples of rectifier stations or HVDC power sources arranged to feed DC current to a modular HVDC converter system according to the present invention.
Figure 4B:
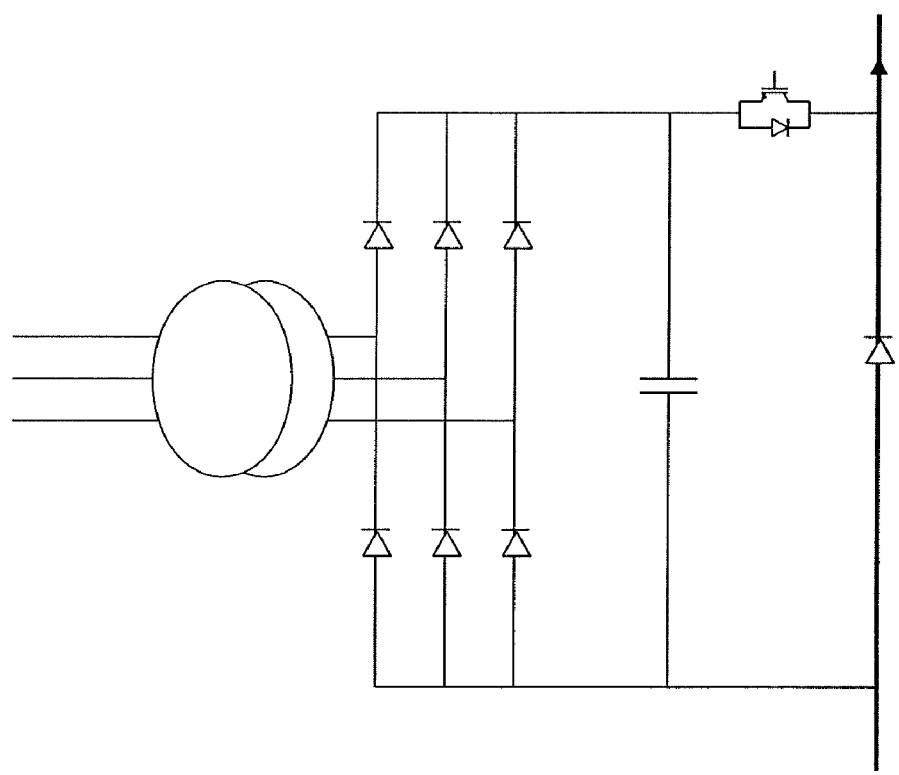
Figure 4C:
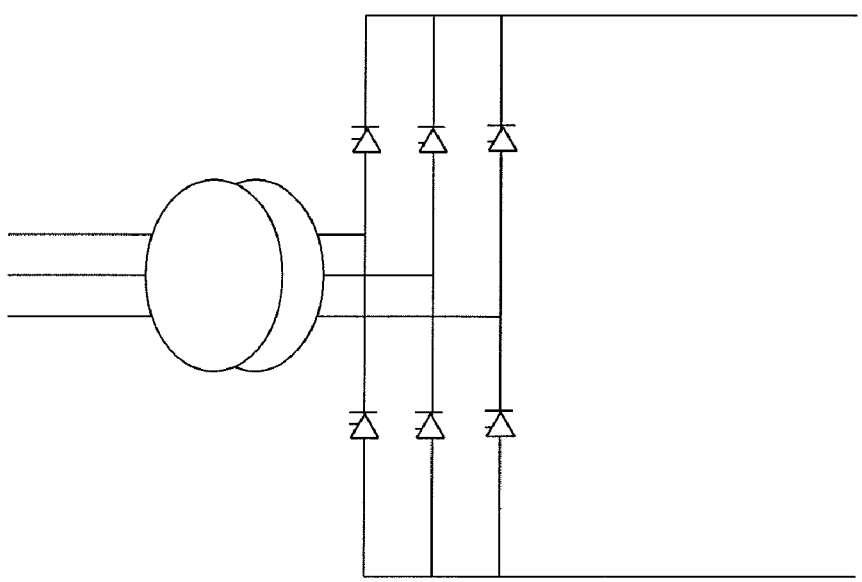

FIG. 1 schematically shows one embodiment of a modular HVDC converter system 1 according to the present invention. The modular HVDC converter system 1 comprises, a High Voltage Direct Current (HVDC) network 2, two or more DC/AC converters 3 being connected in series to the HVDC network, wherein each one of the DC/AC converters is arranged to provide AC to a separate AC load 4. The modular converter is built up of a number of small sized series connected converter units 3, each controlled individually. Failure of one converter will not stop the entire transmission as the others will continue to operate as normal. The converter units 3 are connected in series, and assuming an ideal situation wherein they represent identical loads in the HVDC circuit 2, the voltage across each converter unit will be approximately the HVDC voltage divided with the number of active converters. HVDC is supplied to the HVDC network e.g. by a rectifier station arranged to supply a constant current (Id) at a variable voltage (V). The HVDC network operates at voltage in the range of 50 to 500 kV. In FIG. 1, the HVDC power is supplied by a HVDC converter 5 connected to a three phase High voltage AC network 6, but the HVDC power could obviously be supplied by alternative means, such as a power plant etc. FIGS. 4a to 4c show three examples of rectifier stations or HVDC power sources of which FIG. 4a shows a HVDC Light® type converter, 4b shows a rectifier diode bridge type converter, and 4c shows a thyristor bridge of classic HVDC type. In the disclosed embodiment, the HVDC network is a bipolar network, but it may also be a monopolar network, wherein the earth is used as return path, whereby cable costs are reduced.

Figure 2:
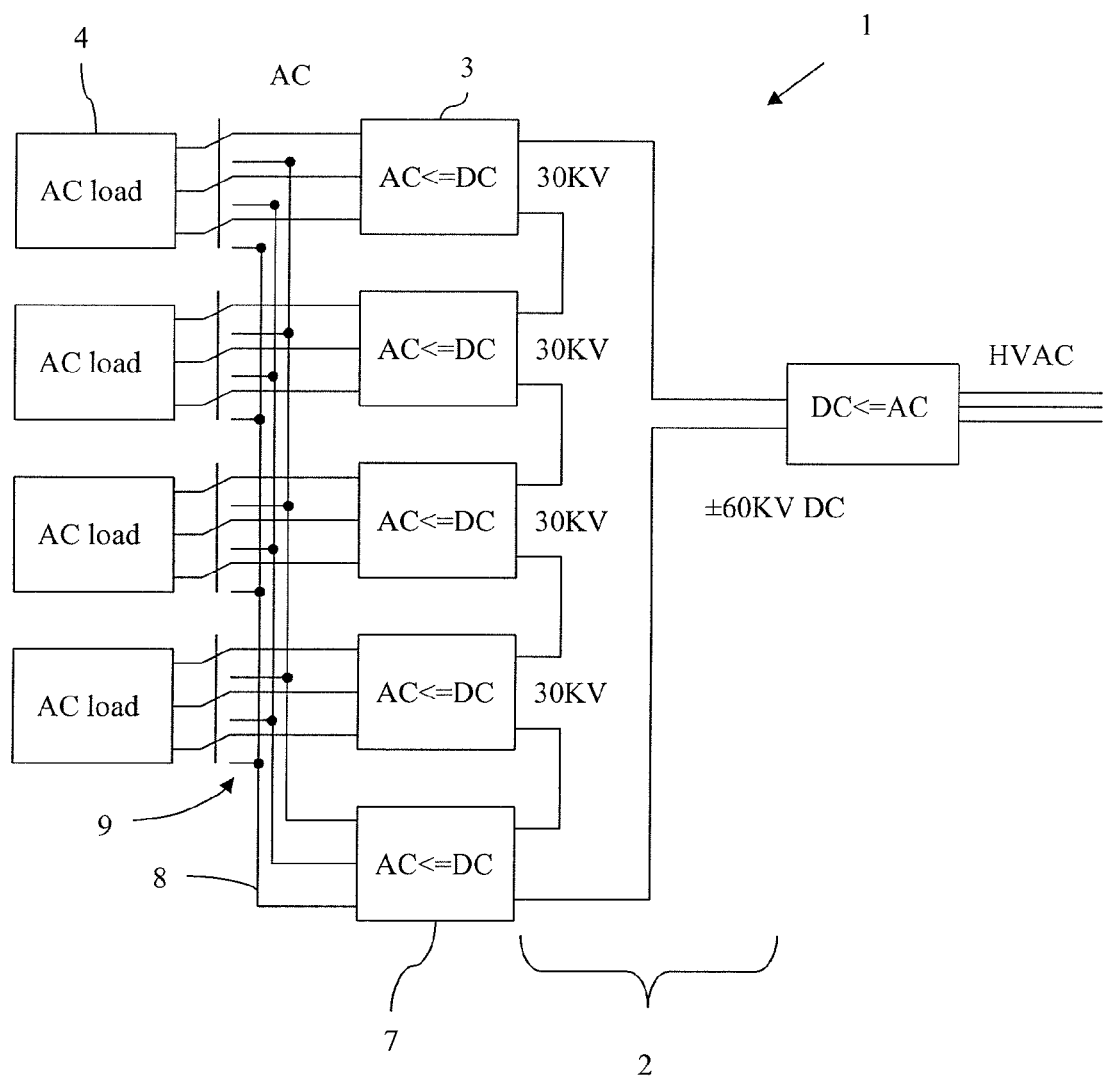
FIG. 2 shows an alternative circuit diagram for the HVDC converter system according to the present invention.

According to one embodiment the converter, units 3 may be connected to their respective load 4 such that the loads 4 can be shifted between two or more converter units 3, 7, whereby the provision of one or more reserve converter units 7 will lead to significantly enhanced redundancy. One example of a modular converter system 1 with enhanced redundancy is shown in FIG. 2, wherein a reserve converter unit 7 can be connected to any one of the loads 4 in case of failure or maintenance of its associated converter unit. In FIG. 2 the reserve converter unit 7 is connected to reserve power conductors 8, in turn connected to reserve power switches 9 that enable connection of each one of the AC load with the reserve power conductors.

Figure 9A:
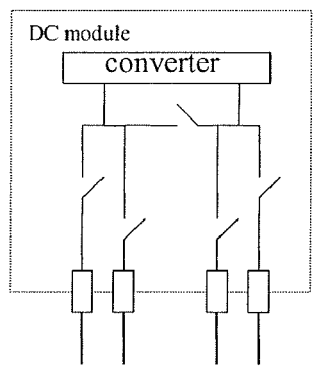
FIGS. 9a and 9b schematically show one alternative embodiment of the converter and a coupling scheme for interconnection of a plurality of such converters.
Figure 9B:
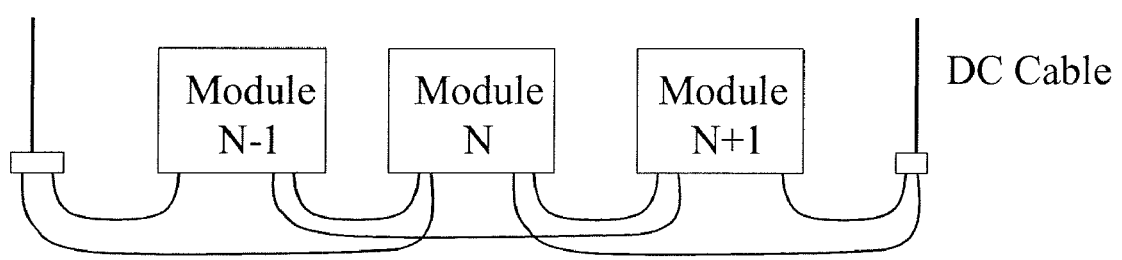

An alternative example of providing improved redundancy is disclosed in FIGS. 9a and 9b, wherein each converter unit 3 is provided with two HVDC inputs and outputs respectively, and the units are connected to each other in an overlapping manner as is shown in FIG. 9b.

According to one embodiment, individual control of the modular converters can be used to create variable frequency and voltage for a motor connected to the AC side and operate as a complete drive system or they can be used to feed auxiliary power at constant voltage and frequency. Hence, any additional drive systems can be omitted.

The individual converters could either be isolated from each other on the ac side feeding different loads with possibly different frequency and voltage levels or connected to a common bus as network supplies or a combination thereof through a normal low voltage switchboard.

The Modular DC/AC Converter

Figure 3:
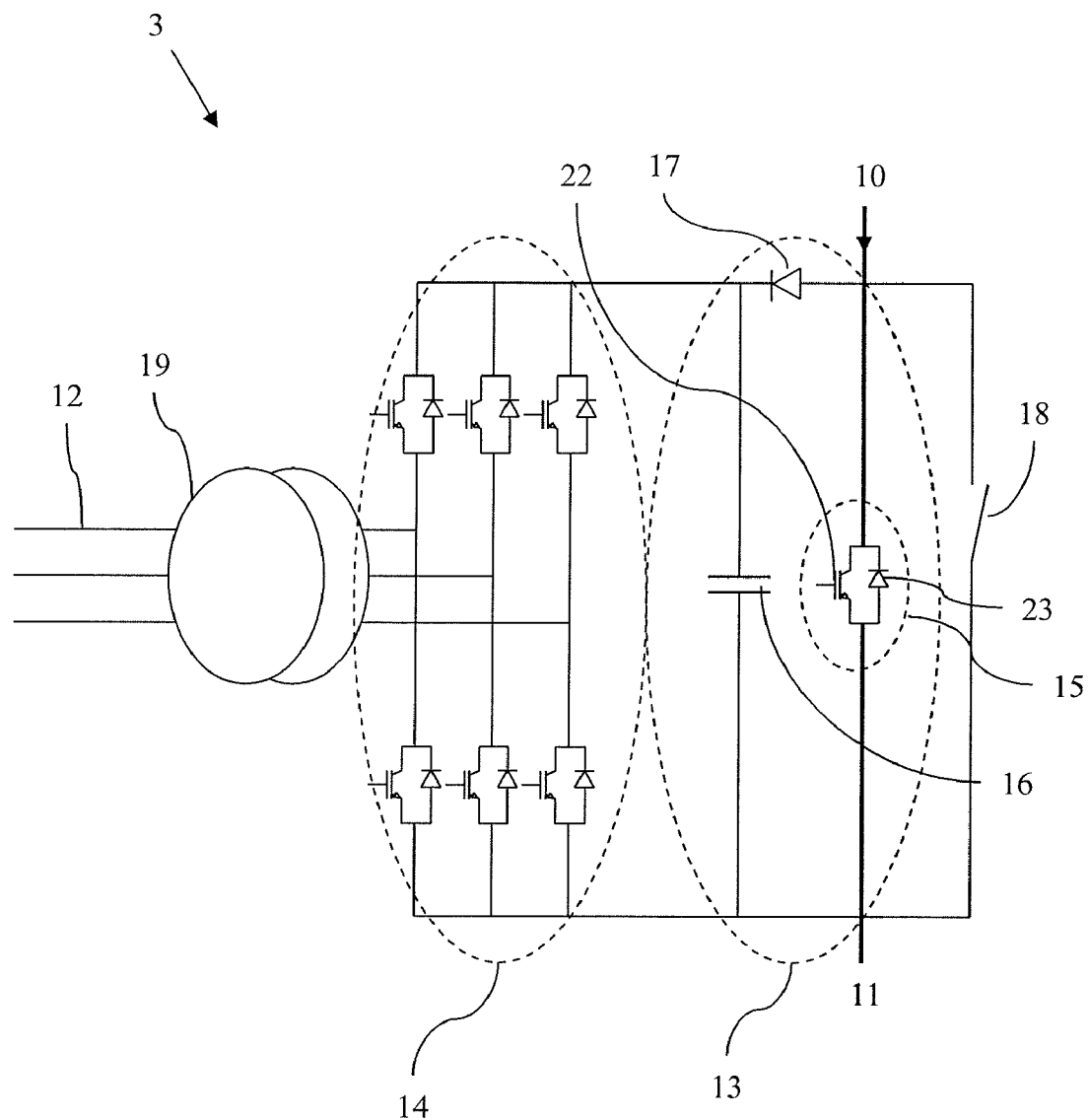
FIG. 3 shows a circuit diagram of one embodiment of a HVDC converter.

FIG. 3 shows one example of a modular DC/AC converter 3 according to the present invention. The DC/AC converter 3 comprises a DC input 10 and a DC output 11 for connection in series with a HVDC network, AC outputs 12 for connection to an AC load, a DC/DC converter 13 arranged to convert a part of the HVDC voltage in the HVDC network to a controlled voltage Medium Voltage Direct Current (MVDC), and a DC/AC converter 14 arranged to convert the controlled voltage MVDC to a controlled voltage AC for feeding the AC load. In the disclosed embodiment, the DC/DC converter 13 is comprised of: a high voltage switch unit (HV switch) 15 that is connected in series with the DC inputs, arranged to provide a controlled DC voltage over a capacitor 16 connected in parallel with the HV switch 15 via a diode 17 on the input side. The DC/AC converter 14 is connected in parallel with the capacitor and will thus have a controlled voltage MVDC on the input side. According to one embodiment, the HV switch is an IGBT switch 22 connected in parallel with a diode 23. According to one embodiment, the DC/AC converter is a two level HVDC Light® Converter Bridge, and the load may be connected to the DC/AC converter by a transformer 19 to reduce the voltage fed to the load. The modular DC/AC converter 3 further comprises a bypass switch 18 in order to bypass the converter 3 in case of malfunction etc.

As mentioned above the DC/AC converter 3 may be arranged to provide controlled voltage AC with variable frequency and voltage for a motor connected to the AC side, whereby the converter can operate as a complete drive system for a motor.

The dc voltage across the HV switch 15 in the DC/DC will vary with the AC load and become zero at no load and equal to the capacitor voltage at maximum load. The switching voltage, i.e. MVDC for the converter will be considerably lower than the total dc voltage depending on how many modular converters are connected in series. According to one embodiment the MVDC voltage is in the range of 5 to 50 kV According to one embodiment, in order to reduce size, switching is done directly towards the transformer 19 without using phase reactors and AC filters. This is expected to be possible since the switching voltage is considerably lower than for a normal HVDC light converter. The transformer also has to be able to hold the dc voltage since the converter will be located on high potential versus ground. If motors are directly fed by the converter, extra AC filters are not expected to be needed however if auxiliary power is fed, a small AC filter might be needed on the low voltage side of the transformer.

In order to fully take advantage of the modular converter system 1, according to one embodiment, the connection and disconnection of the modular converter(s) 3 is simplified. Moreover, the converter connection on the dc side preferably is formed to allow for maintenance in and manned intervention of one converter without affecting operation of the others. This can be done in different ways where one embodiment comprises a centralized high voltage dc switchboard and another is modularized and integrated in the converter modules. Still another embodiment, which could be beneficial in a sub sea environment, comprises a separate plug-in connection box with the connectors close to each converter module. The same principles can be used for both AC and DC connections.

Figure 5:
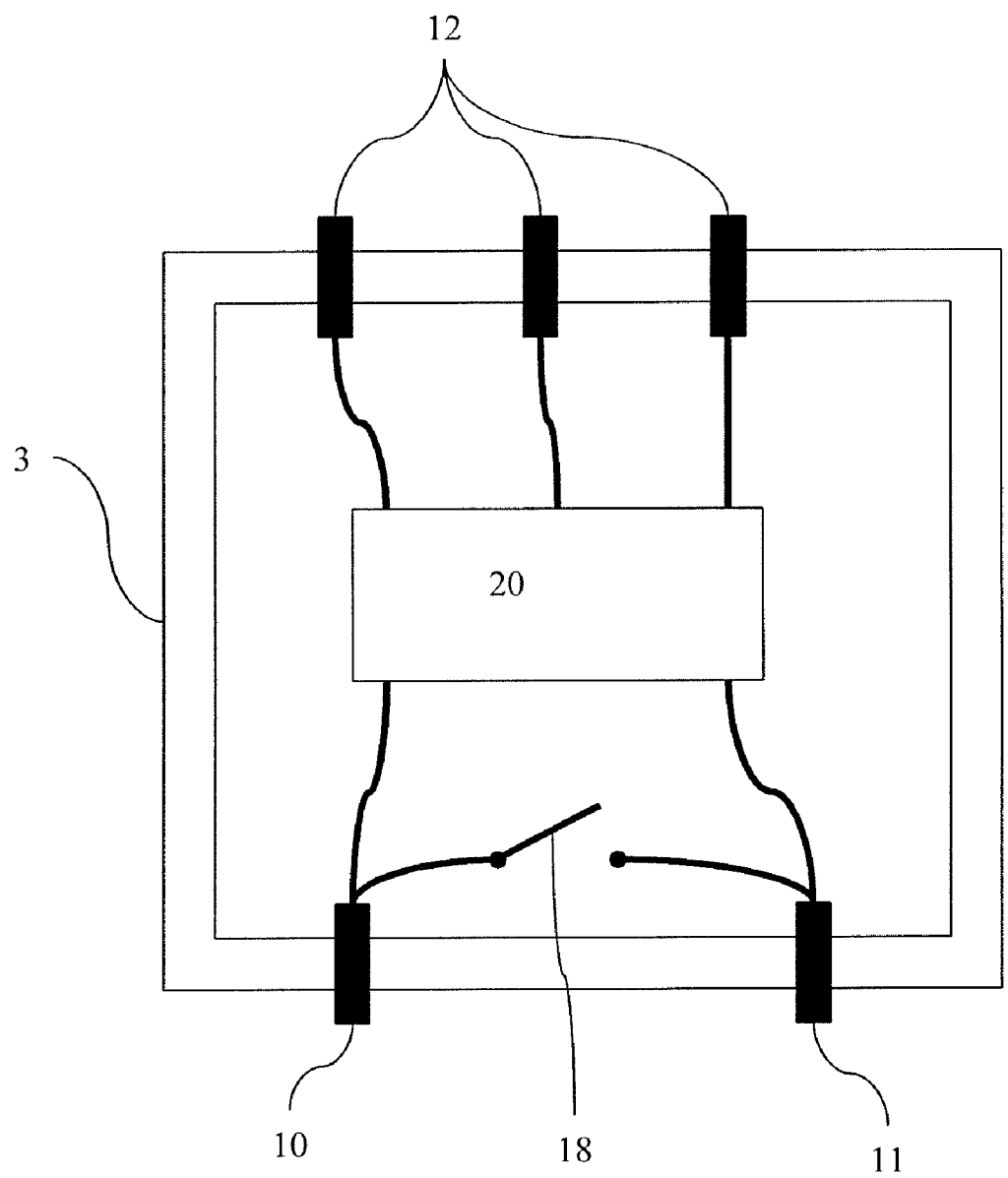
FIG. 5 shows a modular HVDC converter unit according to the present invention.

Hence, according to one embodiment, there is provided a modular HVDC converter system, comprising two or more modular HVDC converter units 3, FIG. 5, each comprising HVDC connection means 10, 11 for detachable connection to a HVDC network 2 in series with at least one additional modular HVDC converter unit 3, AC connection means 12 for detachable connection to a local AC network 4, and a current converter 20 for converting AC to DC or DC to AC. In order to bypass the converter in case of malfunction of the converter itself or the load connected thereto, the converter unit may comprise a HVDC bypass switch 18. To facilitate bypass of the converter unit, the bypass switch 18 can be remote controllable, which is especially suitable in situations where the converter unit is awkwardly situated.

Figure 6A:
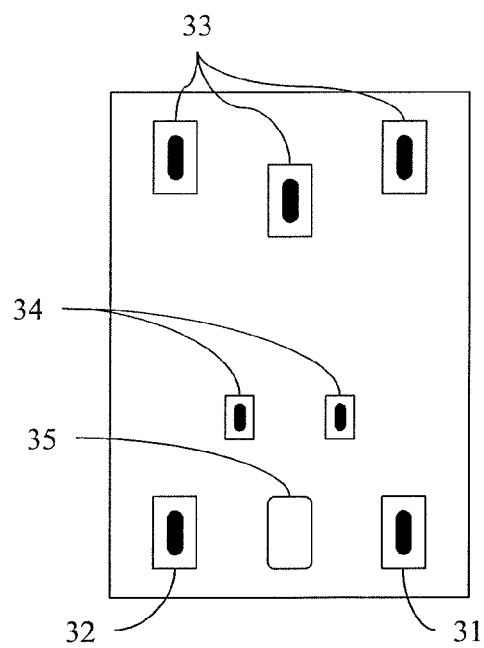
FIGS. 6a and 6b schematically show a layout of a plug in socket and a mating plug in converter, respectively.
Figure 6B:
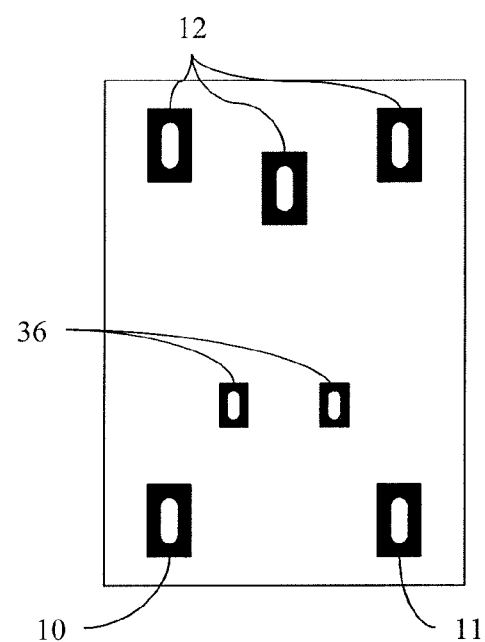

According to one embodiment, the HVDC connection means 10, 11 and the AC connection means 12 are provided in a plug-in arrangement, enabling plug-in attachment in a converter unit socket. One schematic example of a plug-in arrangement is shown in FIGS. 6a and 6b. FIG. 6a shows the plug-in configuration of a converter unit socket 30, the arrangement comprising HVDC connectors 31, 32, AC load connectors 33, control connectors 34, and a switch actuator 35. FIG. 6b shows the configuration of a plug-in arrangement of the connectors of a HVDC converter unit 3 that mate the plug in socket arrangement of FIG. 6a. In FIGS. 6a and 6b control connectors 36 and corresponding socket connectors 34 have been included, the control connectors 34, 36 enabling contact between the HVDC converter unit and a control network for transmission of control signals to and from the converter unit. However, the transmission of such control signals could also take place without use of a dedicated control network, such as by transmission of superimposed signals in the HVDC network, or by wireless transmission.

Figure 7A:
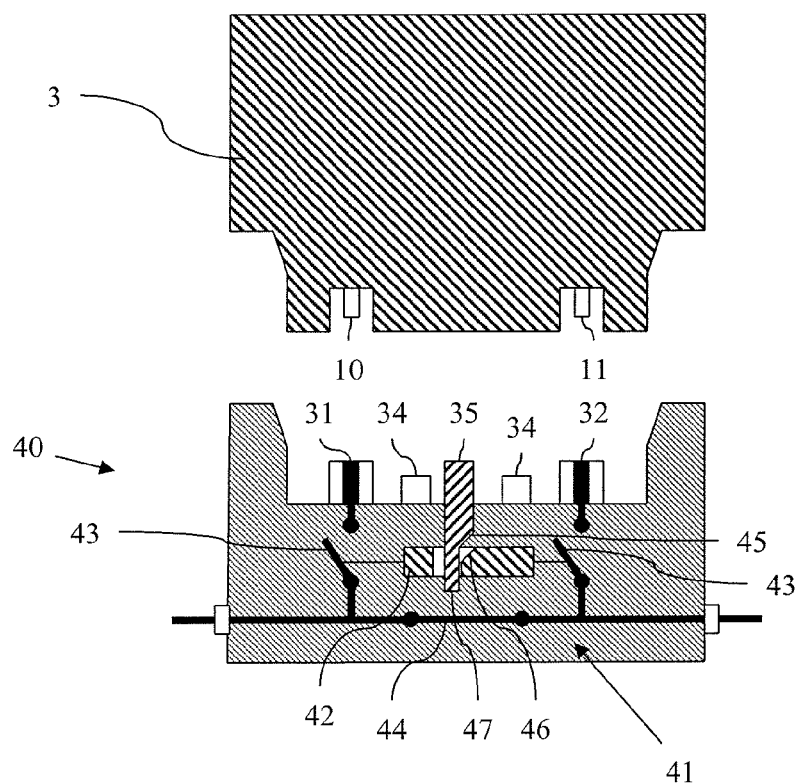
FIGS. 7a to 7c schematically show a plug in socket and a mating plug in converter.
Figure 7B:
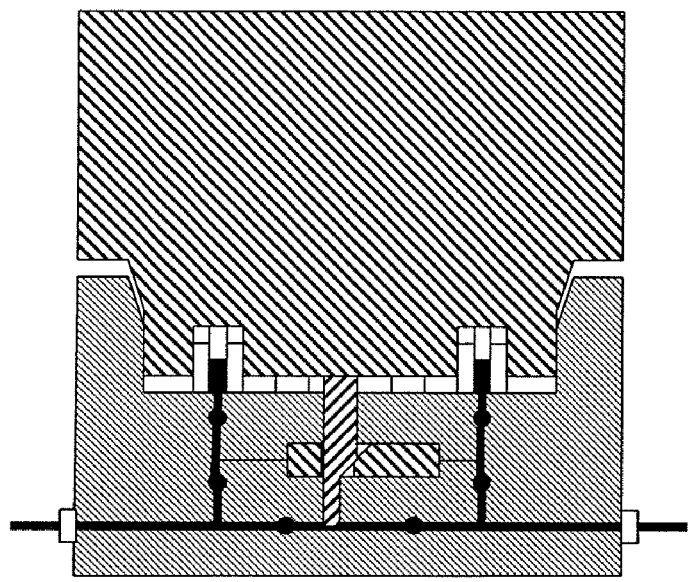
Figure 7C:
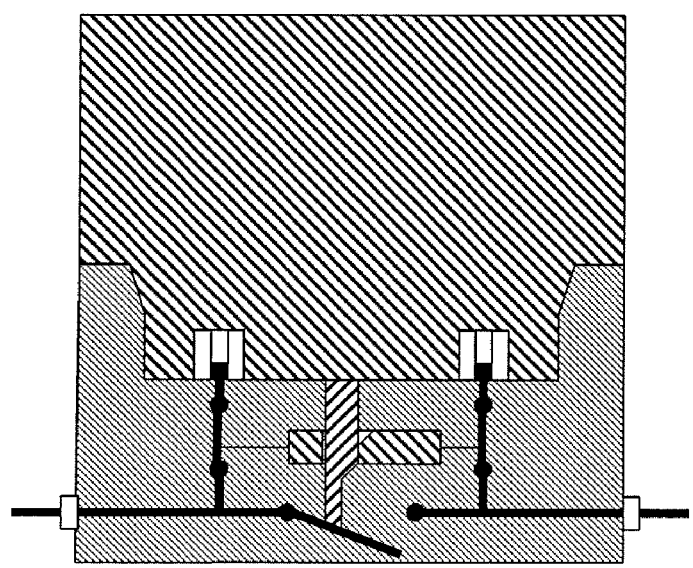

FIGS. 7a to 7c show the connection of a HVDC converter unit 3 to a converter unit socket 40. In this embodiment, the converter unit socket comprises a schematic automatic switch arrangement 41, arranged to bypass the socket 40 when no converter unit 3 is arranged therein. The switch arrangement 41 is comprised of a switch actuator 35, a transverse member 42, two connection switches 43 and a bypass switch 44. The transverse member 42 is arranged to control the connection switches 43 and is limited to movement in the horizontal plane. The transverse member 42 is biased in the direction that opens the connection switches 43 and is provided with an inclined control surface 45 that interacts with a mating surface 46 on the switch actuator 35. The switch actuator 35 has a protrusion 47 arranged to effect connection and disconnection of the bypass switch 44. As can be seen from FIGS. 7b and 7c, the connection switches 43 are initially connected by the transverse member 42, and thereafter the bypass switch 44 is disconnected by the switch actuator 35.

By the provision of the plug-in arrangement, the connection and disconnection of the modular HVDC converter unit in the modular HVDC converter system, will be extremely simple and fast. Such an plug-in converter unit is especially suitable for sub-sea conditions, whereby the plug-in arrangement preferably is formed to allow connection/disconnection of modular converter units from the surface without need for personnel on site sub-sea. However, the plug-in arrangement is also beneficial in many other installations where e.g. quick replacement of defect converter units is required.

Figure 8:
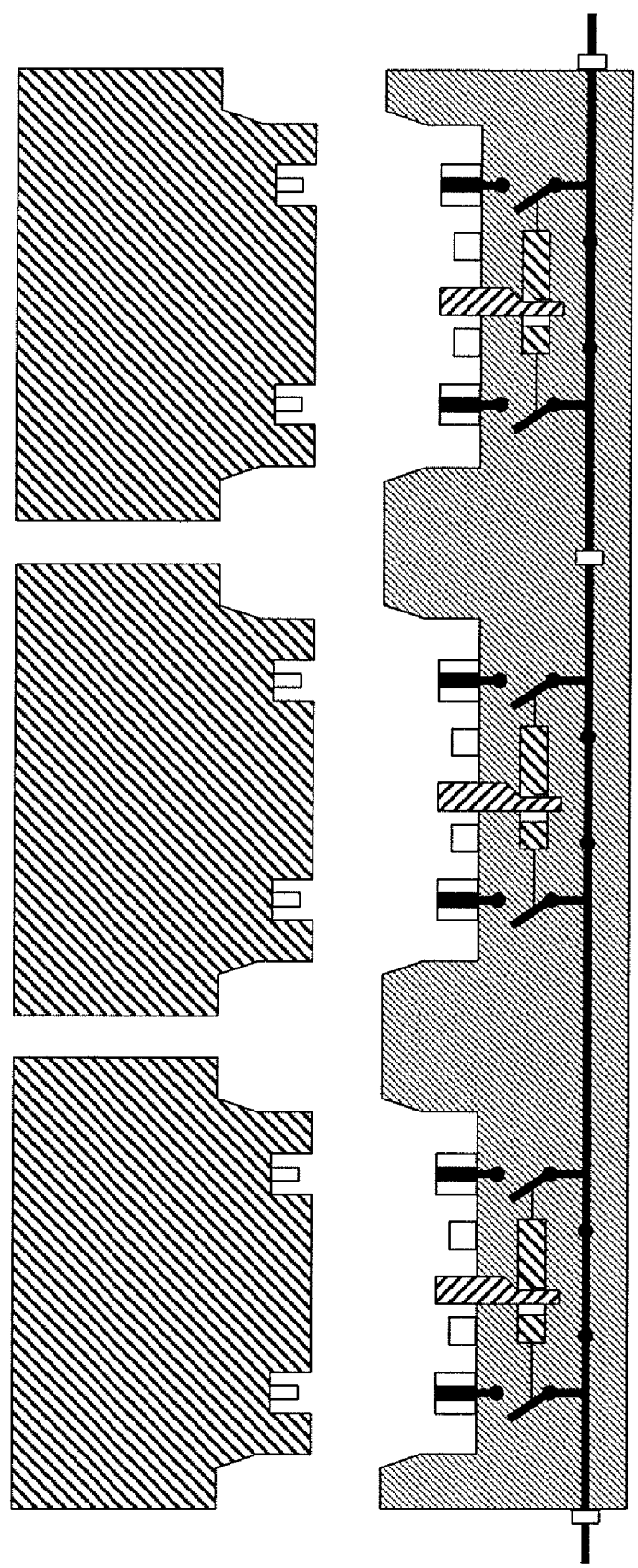
FIG. 8 shows an alternative plug in socket and plug in converter arrangement.

In order to facilitate installation of the modular HVDC converer system according to the present invention, a plurality of plug-in converter unit sockets may be integrated as one socket with a plurality of plug-in positions for converter units 3. FIG. 8 shows an embodiment such of a plug-in converter unit socket comprising three plug-in positions.

As already mentioned, the modular HVDC converter unit according to the present invention is very suitable for sub-sea installations, such as precompression of natural gas reserves. Hence, for such installations the converter unit is provided with a housing, dimensioned to withstand sub sea conditions. Moreover, according to one embodiment, the HVDC connection means and the AC connection means are of sub-sea type, enabling sub-sea connection and disconnection.

According to one embodiment the current converter is a DC/AC converter and the modular HVDC converter unit is arranged to drive an AC load in the local AC network. As discussed above, the DC/AC converter can be arranged to provide AC with variable frequency, in order to provide direct control the frequency of rotation of an AC load in the form of an electric motor. In one embodiment, the modular HVDC converter unit is comprised as a part of an electric drive motor arrangement, e.g. arranged to drive a compressor unit at an offshore installation. The modular HVDC converter unit according to the present invention is very suitable to provide electric power to a cluster of compressor units at an offshore location, in that the system has a high level of redundancy. Redundancy in motor drives are normally not required since the motors and compressors are often made in steps and loosing one step is not unusual and does not stop operation of the other motors. However redundancy is often required for normal platform supply, which easily can be achieved if two converters are used to feed auxiliary power. The power that needs redundancy is typically 10-20% of the total power supply. According to one embodiment, the electric drive motor arrangement comprises a converter unit socket according to above, whereby the advantages related to simple connection and disconnection of the modular HVDC converter as discussed above are achieved. The converter unit socket may further be provided as an integrated part of the drive motor arrangement.

Figure 10:
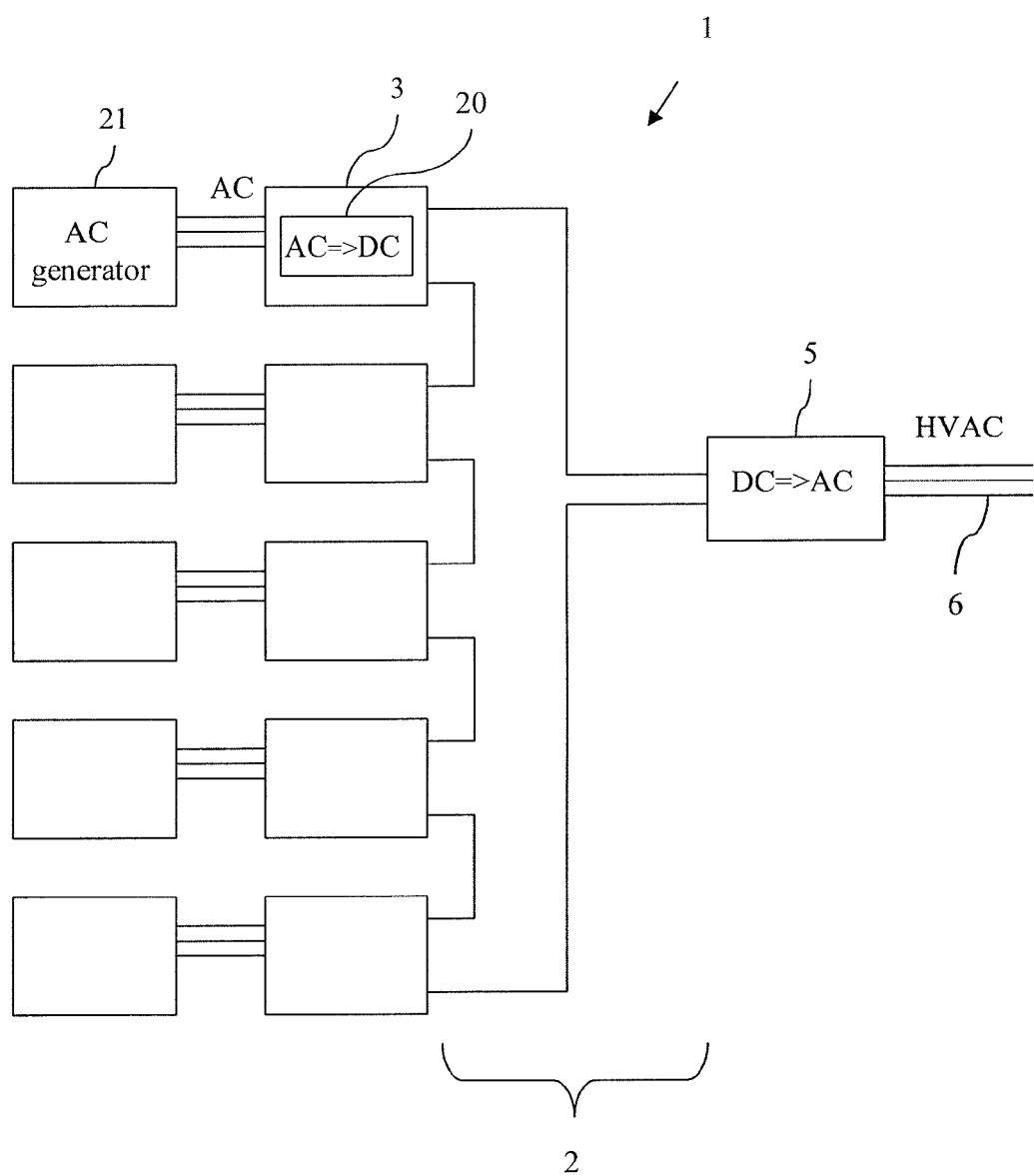
FIG. 10 shows still an alternative circuit diagram for the HVDC converter system according to the present invention.

According to another embodiment, schematically shown in FIG. 10, the current converter is an AC/DC converter 20 and the modular HVDC converter unit is arranged to supply power generated in the local AC network to the HVDC network. According to one embodiment, the AC power in the local AC network is supplied by an AC generator arrangement 21. Like in the motor arrangement above, a modular HVDC converter unit can be comprised as a part of generator arrangement 21. The generator arrangement 21 may e.g. be arranged in a wind turbine unit, a wave power unit, or the like and is especially suitable for clusters of such units arranged at remote locations, such as on offshore locations.

The invention claimed is:
1. A modular DC/AC converter system, comprising:
    a DC input and a DC output for connection in series with at least one additional modular DC/AC converter system in an HVDC network;
    AC outputs for connection to an AC load;
    a DC/DC converter arranged to convert a part of an HVDC voltage in the HVDC network to a controlled medium voltage direct current voltage, wherein the DC/DC converter comprises a high voltage switch that is connected in series with the DC input, and wherein the DC/DC converter is arranged to provide a controlled DC voltage over a capacitor connected in parallel with the high voltage switch via a diode on an input side; and
    a DC/AC converter arranged to convert the controlled medium voltage direct current to a controlled AC voltage for feeding the AC load, wherein the DC/AC converter is connected in parallel with the capacitor.
2. The DC/AC converter system according to claim 1, wherein the high voltage switch is an IGBT switch.
3. The DC/AC converter system according to claim 1, wherein the DC/AC converter is arranged to provide AC voltage with variable amplitude and frequency.
4. The DC/AC converter system according to claim 1, wherein the DC/AC converter comprises a transformer directly connected to an AC side of the DC/AC converter.
5. The DC/AC converter system according to claim 1, wherein the HVDC network voltage is from 50 to 500kV.
6. The DC/AC converter system according to claim 1, wherein the medium voltage direct current voltage is from 5 to 50 kV.
7. The DC/AC converter system according to claim 1, wherein the DC input and DC output comprise HVDC connections for detachable connection to the HVDC network, wherein the AC outputs comprise AC connections for detachable connection to the AC load, the DC/AC converter further comprising:
    an HVDC bypass switch being configured to interconnect the HVDC connections to bypass the DC/AC converter.
8. The DC/AC converter system according to claim 7, wherein the HVDC connections and the AC connections comprise a plug-in arrangement, enabling plug-in attachment in a converter unit socket.
9. The DC/AC converter system according to claim 7, further comprising:
    a housing, dimensioned to withstand sub sea conditions.
10. The DC/AC converter system according to claim 7, wherein the HVDC connections and the AC connections comprise sub sea connections configured to enable sub sea connection and disconnection.

11. A converter unit socket, comprising:
mating connection terminals configured to receive one or more modular DC/AC converters comprising a DC input and a DC output for connection in series with at least one additional modular DC/AC converter in an HVDC network, AC outputs for connection to an AC load, a DC/DC converter arranged to convert a part of an HVDC voltage in the HVDC network to a controlled medium voltage direct current voltage, wherein the DC/DC converter comprises a high voltage switch that is connected in series with the DC input, and wherein the DC/DC converter is arranged to provide a controlled DC voltage over a capacitor connected in parallel with the high voltage switch via a diode on an input side, a DC/AC converter arranged to convert the controlled medium voltage direct current to a controlled AC voltage for feeding the AC load, wherein the DC/AC converter is connected in parallel with the capacitor, and an HVDC bypass switch being configured to interconnect the HVDC connections to bypass the DC/AC converter, wherein the DC input and DC output comprise HVDC connections for detachable connection to the HVDC network, wherein the AC outputs comprise AC connections for detachable connection to the AC load, the DC/AC converter further comprising: an HVDC bypass switch being configured to interconnect the HVDC connections to bypass the DC/AC converter.

12. The converter unit socket according to claim 11, wherein the connection terminals are sub-sea connection terminals.

13. The converter unit socket according to claim 11, further comprising:
a bypass switch and connection switches for the HVDC connection.

14. The converter unit socket according to claim 13, wherein the bypass switch is mechanically opened by the DC/AC converter when placed in the socket.

15. A modular HVDC converter system, comprising:
a HVDC network; and
at least two modular DC/AC converters connected in series to the HVDC network, wherein each one of the modular DC/AC converters is arranged to provide AC to a separate AC load, and wherein at least one of the DC/AC converters is a converter comprising a DC input and a DC output for connection in series with at least one additional modular DC/AC converter in the HVDC network, AC outputs for connection to an AC load, a DC/DC converter arranged to convert a part of an HVDC voltage in the HVDC network to a controlled medium voltage direct current voltage, wherein the DC/DC converter comprises a high voltage switch that is connected in series with the DC input, and wherein the DC/DC converter is arranged to provide a controlled DC voltage over a capacitor connected in parallel with the high voltage switch via a diode on an input side, and a DC/AC converter arranged to convert the controlled voltage medium voltage direct current to a controlled AC voltage for feeding the AC load, wherein the DC/AC converter is connected in parallel with the capacitor.

16. The modular HVDC converter system according to claim 15, wherein HVDC is supplied to the HVDC network by a rectifier station arranged to supply a constant current at a variable voltage.

* * * * *